Nov. 5, 1957  L. BRAUN, JR  2,812,476
METER PROTECTIVE DEVICE
Filed Oct. 19, 1953
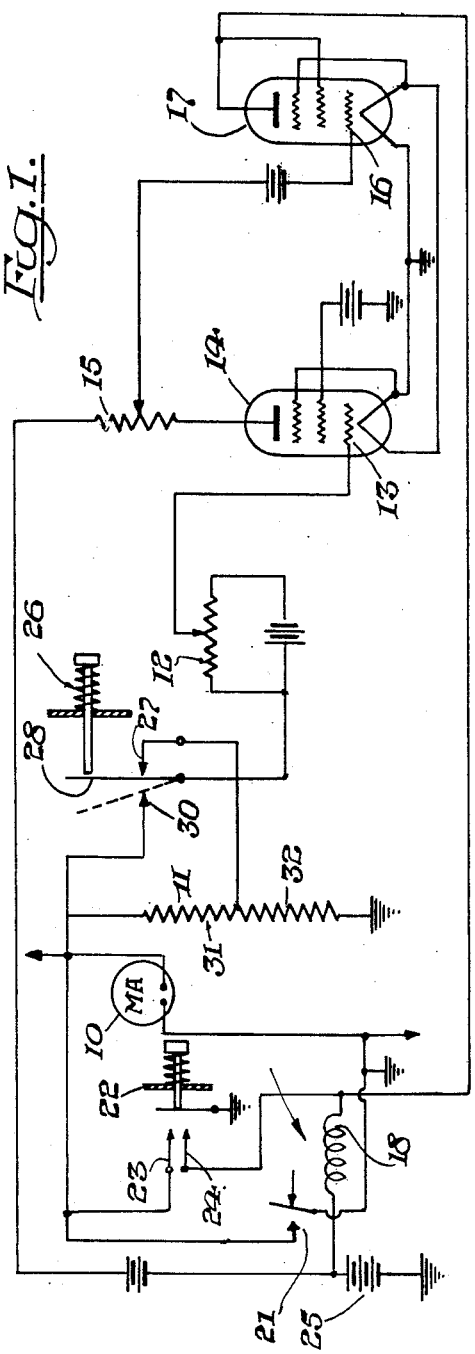
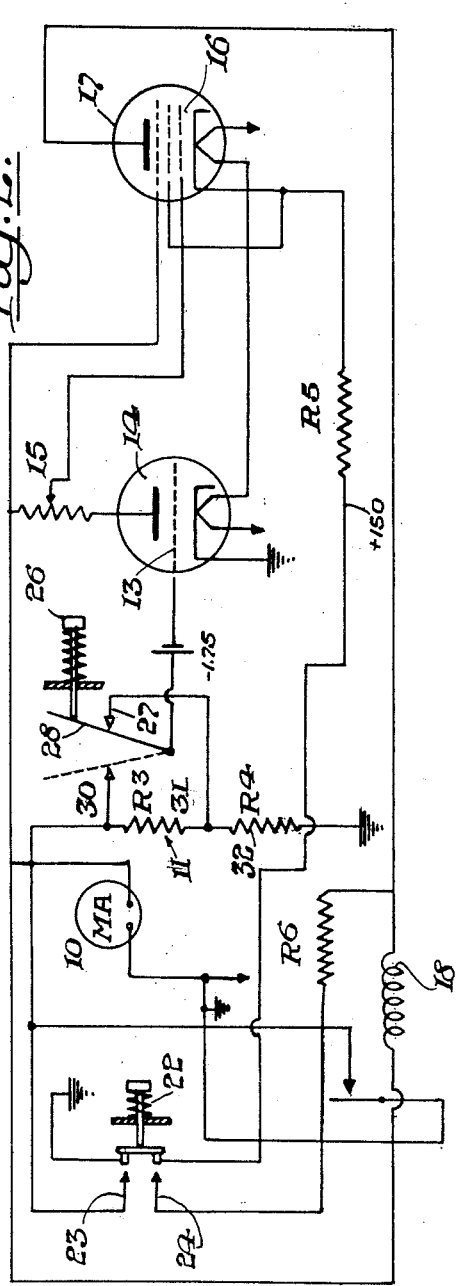
INVENTOR.
*Ludwig Braun*
BY *Darley & Darley*
*HIS ATTORNEYS.*

2,812,476
Patented Nov. 5, 1957

2,812,476
METER PROTECTIVE DEVICE

Ludwig Braun, Jr., Garden City Park, N. Y., assignor to Anton Electronic Laboratories, Inc., Brooklyn, N. Y., a corporation of New York Application October 19, 1953, Serial No. 386,784

2 Claims. (Cl. 317—16)

The present invention relates to a device for protecting a meter against damage due to overload conditions and particularly to such a protective device for protecting sensitive meters particularly meters operating in the range below two milliamperes in which range commercial fuses are not available.

The device consists of a direct current amplifier which amplifies the voltage appearing across the meter and which is made to operate a relay and to deenergize that relay to short-circuit the meter when the current through and therefore the voltage drop across the meter exceeds a predetermined upper limit.

The circuit includes a relay which inherently possesses a differential between the current required to cause the armature to pull up and that required to cause the armature to leave its contacts. This differential of course results from the fact that when the relay is deenergized there is a large air gap and a relatively large current is consequently required to cause the armature to pull up against the action of the bias spring. However, once the relay has been energized the air gap is minimized and less current in the coil will then cause the relay to remain operated, and the current must fall below the pull-up value to cause release of the armature. In the instant circuit the relay current at zero input condition from the meter circuit is between the pull up and the drop out conditions so that a reset switch is utilized to cause the relay to pull up. The relay then remains operated until the external circuit causes the current to fall to such an extent as to permit the restoration of the relay armature to its inoperated condition.

The device is so arranged that any failure, such, for example, as aging of the batteries supplying the amplifier and relay circuits causes the short-circuiting relay to be deenergized and the meter to be short-circuited.

The device is furthermore provided with means for calibrating it so that it may be used with a variety of meters operating under different load conditions and is provided with a reset switch for reenergizing the relay after it has become deenergized as a result of overload on the meter.

It is an object of the invention to provide a protective device for sensitive ammeters.

It is another object of the invention to provide such a protective device which is "fail safe," that is, which will short-circuit the protected ammeter upon failure of the circuits of the protective device itself.

It is a further object of the invention to provide such a device which is "fail safe" even when the energizing currents for the device are supplied by batteries and those batteries age to an extent where they no longer supply the proper operating currents.

It is a still further object of the invention to provide a meter protective device or meter guard which may be calibrated for use with various meters within its range and which is provided with a reset switch whereby the meter and device may be rendered operative and restored to operation after it has operated to protect the meter.

Other objects and features of the invention will be apparent when the following description is considered in connection with the annexed drawings, in which, Figure 1 is a schematic circuit diagram of the meter guard of the present invention the device being battery-operated; and Figure 2 is a schematic diagram of a modification of the invention wherein the device is supplied with current from a D. C. power source other than batteries.

Referring now to the drawings there is shown at 10 a sensitive ammeter which is to be protected and which is connected in an external circuit in the usual manner as indicated by arrows in the drawings.

The voltage across the meter 10 is supplied to voltage divider 11 and, in the operating condition as shown in the drawing, a definite portion of the voltage drop across the meter is applied through a voltage divider 12 to the control grid 13 of the electron tube 14. The plate potential of the amplifier tube 14, as modified by means of the sensitivity control potentiometer 15, is applied to the input grid 16 of the second stage amplifying tube 17. The output of the tube 17 is supplied to the winding 18 of a relay 20.

When the meter 10 is operating within the predetermined load limits the adjustments of the various circuit elements previously described are such that relay 18 is retained operated and its contacts 21 opened. If the voltage across meter 10 exceeds the predetermined higher limit, the bias on grid 16 causes the plate current of tube 17 to decrease, thus reducing the current in relay 18 to a point to cause the armature to be released, contacts 21 thereof to be closed and meter 10 shunted out.

In order that the device may be reset a switch 22 is provided, the switch being spring-loaded and manually operated. Upon operation this switch, through its contact 23, places a ground across the meter 10 thus protecting the meter and at the same time, by closure of its contacts 24, short-circuits the amplifier tube 17 thereby removing control of relay 18 from tube 17 and permitting the relay current to increase to a point above the pull in current of the relay. Thus the relay 18 is energized sufficiently to pull up and open its contacts 21. Once the relay has operated it is retained in this condition by a lesser current supplied by the tube 17. In other words, relay 18 is designed to "pull in" at a definite amount and to "drop out" only when the current is reduced to a predetermined lesser value.

The device will then continue to operate to protect the meter and will again operate in the same manner above-described in the event of another overload condition.

As will be obvious, if the filament of either tube breaks both filaments are open circuited and no current is supplied to the relay 18 which then releases its armature closing its contacts and short-circuiting the meter 10.

As an added precaution against failure the operating conditions for the second stage amplifier tube 17 are so chosen that aging of the batteries supplying its plate current and consequent drop in the voltage supply thereto causes the relay 18 to release and shunt the meter 10. Additionally, the conditions are such that the batteries supplying the second stage age more rapidly than those supplying the first stage and even with zero bias on the second stage the first stage gain is sufficient to operate the second stage if it were operating normally. This ensures against the possibility of the first stage being unable to drop out the relay 18 due to battery aging and requires only that the first stage batteries be replaced at the same time as the second stage batteries.

Since, as above stated, it is intended that the protective device be usable on a plurality of individual meters operating within the intended range, it is desirable that the device be capable of being calibrated to operate properly with the particular meter selected.

In order to accomplish this a calibration switch 26 is provided. This switch is similar to switch 22 being manually operable and spring-returned to its unoperated position. In its normal position, as shown in the drawings, switch 26 is positioned against its right hand contact 27 and applies the voltage appearing across the portion 32 of the voltage divider 11 to the grid cathode circuit of the tube 14. In order to calibrate the device for the particular meter with which it is to be used, switch 26 is operated causing armature 28 thereof to make contact with the left hand contact 30. While the calibrating switch 26 is held in the left hand position the entire voltage across meter 10 is applied to the input grid of tube 14. While the switch is thus positioned the potentiometer 15, which controls the sensitivity of the device, is adjusted so that the relay 18 releases its armature thereby closing contact 21 and short-circuiting the meter 10. This adjustment is made with a meter current such as to cause full scale deflection, and with the corresponding voltages applied to the input grid 13 of the tube 14. As will be obvious, when the device has been thus adjusted and the switch 26 is returned to its normal position, the input grid, being then connected to a tap on the voltage divider 11 will receive only a portion of the meter voltage. The portion which will be received is a function of the voltage divider ratio. In the particular instance the portion 32 of the voltage divider has a 2:1 ratio to the portion 31 thereof and the meter will consequently be short-circuited when an overload of 150% of the full scale current occurs.

The form of the device shown in Figure 2 is essentially identical with that shown in Figure 1 and the parts thereof have been given the same reference characters for this reason. The only differences are that the two tubes used are of different types since they are supplied with line voltage rather than being battery operated and the various resistors, voltage dividers and biasing circuits are varied in accordance with the supply and the type of tubes utilized.

In the battery operated form of the device shown in connection with Figure 1, values of the various circuit elements which may be utilized to produce a device adapted to the protection of a meter operating in the range below two milliamperes are stated below.

The voltage divider 11 consists of one section 31 of 4.7 megohms and another section 32 of 10 megohms. The biasing battery for the tube 14 comprises a stack of four Mallory mercury cells. The sensitivity controlling potentiometer 15 has a value of 2 megohms. The biasing battery for the second stage comprises a 30 volt hearing aid battery. The battery 25 which supplies plate voltage to the tube 17 consists of a stack of thirteen Mallory R. M.–625 mercury cells and the additional plate supply for the first amplifier stage is a 22.5 volt hearing aid battery.

In this form of the invention the two tubes which were utilized were Raytheon type CK546DX.

While I have described preferred embodiments of my invention it will be understood that many modifications may be made without departing from the spirit thereof. I wish therefore not to be limited by the foregoing description, but solely by the claims granted to me.

What is claimed is:

1. A protective system for a sensitive electrical device comprising, in combination, a relay having a winding and a pair of contacts, a shunt circuit across the device, said circuit including said relay contacts, means for operating said relay to open said contacts and remove said shunt from said device, an electron tube amplifier having input and output circuits, means supplying a voltage from said device to said input circuit and means connecting said relay winding to said output circuit to normally maintain said relay in operated position, said amplifier output being reduced upon overload of said device to cause said relay to release and complete said shunt circuit about said device, said means for operating said relay comprising a source of voltage and a switch connected in a series circuit across said relay winding to cause said relay to energize and open said contacts.

2. A system in accordance with claim 1, characterized in that said relay-operating switch has a further contact thereon, said further contact being in a circuit shunting said device whereby said device is shunted during the period when said switch is closed thereby protecting said device during resetting of said protective system.

References Cited in the file of this patent

UNITED STATES PATENTS 2,009,973     Nelson                 July 30, 1935
2,451,953     Ingram                Oct. 19, 1948

OTHER REFERENCES

Peters: Abstract of application No. 62,346, published October 14, 1942. O. G. vol. 663, page 570.